W. S. BRAZIER.
Globe and Angle Valve.
No. 224,133. Patented Feb. 3, 1880.
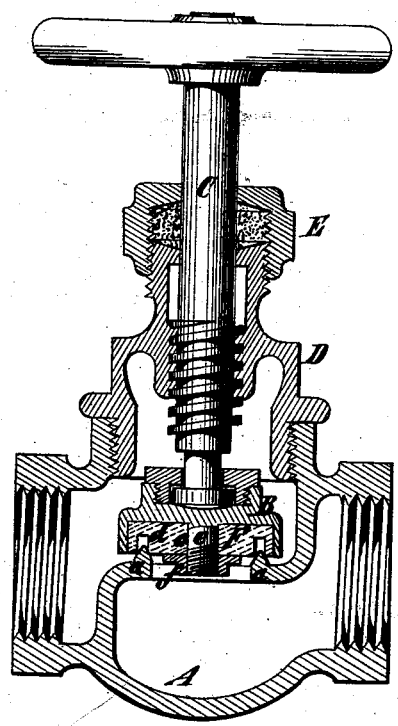
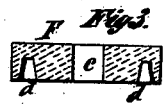
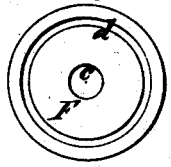

UNITED STATES PATENT OFFICE.

WILLIAM S. BRAZIER, OF NEW YORK, N. Y.

GLOBE AND ANGLE VALVE.

SPECIFICATION forming part of Letters Patent No. 224,133, dated February 3, 1880.

Application filed May 29, 1879.

*To all whom it may concern:*

Be it known that I, WILLIAM S. BRAZIER, of the city, county, and State of New York, have invented certain Improvements in Globe and Angle Valves and Analogous Articles, of which the following is a specification.

The object of my invention is to provide a durable and cheap soft-metal washer or face-piece for an angle or globe valve, which may be secured to said valve or detached therefrom in a simple and expeditious manner; and to this end it consists in the combination, in a valve, of a projecting flange-like seat, a hollow disk or cup provided with a central screw, a washer or face-piece of metal softer than the valve-seat, provided with an annular groove for fitting over said valve-seat, and a central opening through the said washer, through which the said screw passes, and a nut fitting upon the screw outside the central portion of the said washer or face-piece and securing the latter in place, whereby said washer or face-piece is prevented from spreading, and the said groove is caused to maintain a tight fit upon the valve-seat.

It also consists in a valve-washer or face-piece made of metal softer than the valve-seat, and provided with an annular groove for fitting over said valve-seat, and constructed so that its opposite walls are parallel with each other, or of less angularity than the adjacent walls of the valve-seat, whereby the said washer or face-piece can wedge tightly down over the said valve-seat.

In the accompanying drawings, Figure 1 is a central longitudinal section of a globe-valve embodying my invention. Fig. 2 is a transverse section of a washer or face-piece embodying the invention. Fig. 3 is a similar section of a washer or face-piece of modified form, and Fig. 4 is a face view of the washer first named.

Similar letters of reference designate corresponding parts in all the figures.

A designates the body of the valve, which may be of any suitable form. B designates the disk-cup of the valve, operating in connection with a flange-like inverted-V-shaped seat, *a*, arranged in a partition within the body A of the valve. This valve comprising this disk-cup is forced upon and removed from its seat by a screw-threaded stem, C, connected to it by a swivel-joint in a well-known manner, and engaging with a screw-thread in the bonnet D, which latter is secured to the body A by a screw-threaded boss extending from it and entering a screw-threaded socket in the said body A. A stuffing-box, E, serves to prevent leakage around the stem C.

F designates a washer or face-piece, (shown as disk-shaped,) made of soft metal, such as Babbitt metal, having a central opening, *c*, through it, and provided in its face with an annular groove, *d*, of such size that it will fit upon the flange-like seat *a* in the body A. The said groove *d* is preferably so shaped that its opposite walls are parallel with each other, or of less angularity than the adjacent walls of the valve-seat, whereby the said washer or face-piece can wedge tightly down over the said valve-seat. This washer or face-piece is fitted within a cup-shaped or cylindric recess in the disk-cup B of the valve, and around a screw, *e*, extending therefrom, and it is secured in place by means of a nut, *f*, screwed against its outer face upon the screw *e*. The walls of the washer or face-piece F may be parallel, as shown in Figs. 1, 2, and 4, or either or both may be inclined, as illustrated in Fig. 3.

Preferably the face of the washer or face-piece F opposite to that in which is the groove *d* is flat, so that said washer may be reversed in position and used in a valve having a flat seat.

A valve provided with a washer or face-piece of the kinds described will have a double bearing, or bearing on each side of its seat; hence on its expansion or contraction, or the expansion or contraction of its seat, one or other of the faces of its groove will be caused to bear tightly against the seat and preclude leakage. The two walls, acting in conjunction with the intermediate seat, form very secure protection against leakage. As the washer or face-piece is made of soft metal, any sediment, scale, or other hard substance entering between the valve and its seat will embed itself into the same, and will not injure the seat; hence the liability of leakage being occasioned by scratching or otherwise injuring the seat is greatly reduced.

As the soft-metal washer or face-piece is held within the recess in the hollow disk or cup the walls of the latter prevent the washer or face-piece from spreading when its annular groove is forced down over the valve-seat, and the durability of the washer is greatly increased.

The washers or face-pieces, when injured, may be remolded again at slight cost, and hence are very cheap.

What I claim as my invention, and desire to secure by Letters Patent, is—

1. The combination, in a valve, of a projecting flange-like valve-seat, a hollow disk or cup provided with a central screw, a washer or face-piece made of metal softer than the said valve-seat, provided with an annular groove for fitting over said valve-seat and a central opening fitting the said screw, and a nut fitting upon the screw outside the central portion of the said washer or face-piece and securing the latter in place, whereby said washer or face-piece is prevented from spreading, and the groove is caused to maintain a tight fit upon the valve-seat, substantially as specified.

2. A valve-washer or face-piece made of metal softer than the valve-seat, and provided with an annular groove for fitting over said valve-seat, and constructed so that its opposite walls are parallel with each other, or of less angularity than the adjacent walls of the said valve-seat, whereby the said washer or face-piece can wedge tightly down over said valve-seat, substantially as specified.

W. S. BRAZIER.

Witnesses:
EDWIN H. BROWN,
THOMAS E. BIRCH.